United States Patent
Sambhwani et al.

(10) Patent No.: US 8,416,706 B2
(45) Date of Patent: Apr. 9, 2013

(54) APPARATUS AND METHOD FOR DUAL-CELL HIGH-SPEED UPLINK PACKET ACCESS

(75) Inventors: Sharad Deepak Sambhwani, San Diego, CA (US); Aziz Gholmieh, Del Mar, CA (US); Danlu Zhang, San Diego, CA (US); Arjun Bharadwaj, San Diego, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 494 days.

(21) Appl. No.: 12/725,355

(22) Filed: Mar. 16, 2010

(65) Prior Publication Data

US 2010/0238829 A1    Sep. 23, 2010

Related U.S. Application Data

(60) Provisional application No. 61/161,051, filed on Mar. 17, 2009.

(51) Int. Cl.
*G08C 15/00* (2006.01)

(52) U.S. Cl.
USPC .......................................... 370/252; 370/241

(58) Field of Classification Search .................. 370/241, 370/252, 310, 328, 329, 338, 340, 341
See application file for complete search history.

(56) References Cited

U.S. PATENT DOCUMENTS

2007/0091817 A1*  4/2007  Yoon et al. ..................... 370/252
2010/0110988 A1*  5/2010  Marinier et al. .............. 370/328

FOREIGN PATENT DOCUMENTS

WO      2007035047 A2    3/2007

OTHER PUBLICATIONS

International Search Report and Written Opinion—PCT/US2010/027683, International Search Authority—European Patent Office—Mar. 8, 2011.
LG Electronics: "Uplink control channel transmission for LTE-Advanced", 3GPP Draft; R1-090656 LTEA UL Control Channel, 3rd Generation Partnership Project (3GPP), Mobile Competence Centre ; 650, Route Des Lucioles ; F-06921 Sophia-Antipolis Cedex ; France, no. Athens, Greece; Feb. 3, 2009, XP050318533, [retrieved on Feb. 3, 2009].
Partial International Search Report—PCT/US2010/027683—International Search Authority, European Patent Office, Dec. 30, 2010.
Ericsson et al.,: "Introduction of Dual-Cell HSDPA Operation on Adjacent Carriers", 3GPP Draft; R1-084030 25212CRO267R3, 3rd Generation Partnership Project (3GPP), Mobile Competence Centre; 650, Route Deslucioles; F-06921 Sophia-antipolis cedex; France, no. prague, Czech Republic; Oct. 6, 2008, XP050317326.

(Continued)

*Primary Examiner* — Chi Pham
*Assistant Examiner* — Weibin Huang
(74) *Attorney, Agent, or Firm* — D. Scott Juneau

(57) ABSTRACT

A method, an apparatus, and a computer program product for wireless communication are provided in which a plurality of uplink carriers are utilized in a cellular communications system. In an aspect of the disclosure, a wireless terminal configured for use in a cellular network transmits an uplink with a plurality of uplink carriers including an anchor carrier and a secondary carrier, and receives a downlink with a plurality of downlink carriers. Here, the wireless terminal provides feedback information, such as a channel quality indicator and an acknowledgment, corresponding to the plurality of downlink carriers, on an uplink channel on each of respective carriers in a subset of the plurality of uplink carriers.

24 Claims, 11 Drawing Sheets

OTHER PUBLICATIONS

Partial European Search Report—EP12003875—Search Authority—Berlin—Aug. 17, 2012.
European Search Report—EP12003875—Search Authority—Berlin—Nov. 26, 2011.
Huawei: "Considerations on DC-HSUPA Operation" 3GPP Draft; R1-090886, 3RD Generation Partnership Project (3GPP), Mobile Competence Centre; 650, Route Des Lucioles ; F-06921 Sophia-Antipolis Cedex; France, No. Athens, Greece; 20090204, Feb. 4, 2009, XP050318735 [retrieved on Feb. 4, 2009] the whole document.
Qualcomm Europe: "Activation/De-Activation of Secondary UL Carrier in DC-HSUPA", 3GPP Draft; R1-091158_DC HSUPA Carrier Activation and Deactivation, 3RD Generation Partnership Project (3GPP), Mobile Competence Centre ; 650, Route Des Lucioles; F-06921 Sophia-Anti Polis Cedex; France, No. Seoul, Korea; 20090318, Mar. 18, 2009, XP050338781, [retrieved on Mar. 18, 2009].
Qualcomm Europe: "DC-HSUPA Working Assumptions", 3GPP Draft; R1-091598 DC HSUPA Work Assumptions, 3RD Generation Partnershpip Roject(3GPP), Mobile Competence Centre; 650, Route Des Lucioles; F-06921 Sophia-Antipolis Cedex; France, vol. RAN WG1, No. Seoul, South Korea; 20090323-20090327, Mar. 28, 2009, XP050597375, [retrieved on Mar. 28, 2009].
Qualcomm Europe: "On the need for compressed mode for secondary carrier search in DC-HSDPA" 3GPP Draft; R2-085170, 3RD Generation Partnership Project (3GPP), Mobile Competence Centre; 650, Route Des Lucioles; F-06921 Sophia-Antipolis Cedex; France, No. Prague, Czech Republic; 20080923, Sep. 23, 2008, XP050320086, p. ', paragraph 1, p. 4, paragraph 4.

\* cited by examiner

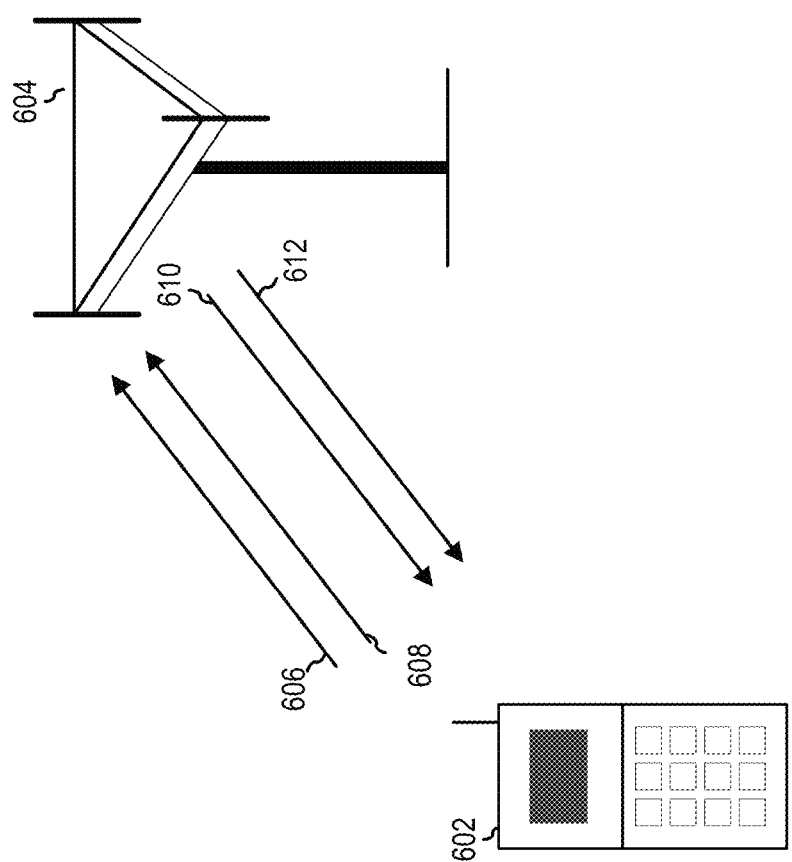

US 8,416,706 B2

APPARATUS AND METHOD FOR DUAL-CELL HIGH-SPEED UPLINK PACKET ACCESS

CROSS-REFERENCE TO RELATED APPLICATION(S)

Pursuant to 35 U.S.C. §119(e), this application claims the benefit of U.S. Provisional Application Ser. No. 61/161,051, filed on Mar. 17, 2009, the contents of which are hereby incorporated by reference herein in their entirety.

BACKGROUND

1. Field

The present disclosure relates generally to communication systems, and more particularly, to a high speed uplink utilizing dual uplink carriers.

2. Background

Wireless communication systems are widely deployed to provide various telecommunication services such as telephony, video, data, messaging, and broadcasts. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UTMS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

3GPP Release 5 and later supports High-Speed Downlink Packet Access (HSDPA). 3GPP Release 6 and later supports High-Speed Uplink Packet Access (HSUPA), sometimes also called enhanced uplink. HSDPA and HSUPA are sets of channels and procedures that enable high-speed packet data transmission on the downlink and uplink, respectively.

As the demand for mobile broadband access continues to increase, research and development continue to advance the UMTS technologies not only to meet the growing demand for mobile broadband access, but to advance and enhance the user experience with mobile communications.

SUMMARY

In an aspect of the disclosure, a method of wireless communication is provided for a cellular network having an uplink with a plurality of uplink carriers including an anchor carrier and a secondary carrier, and a downlink having a plurality of downlink carriers. Here, the method includes providing feedback information corresponding to the plurality of downlink carriers, on an uplink channel on each of respective carriers in a subset of the plurality of uplink carriers.

In another aspect of the disclosure, an apparatus for wireless communication is provided for a cellular network. Here, the apparatus includes means for providing an uplink having a plurality of uplink carriers including an anchor carrier and a secondary carrier, means for receiving a downlink having a plurality of downlink carriers, and means for providing feedback information corresponding to the plurality of downlink carriers, on an uplink channel on each of respective carriers in a subset of the plurality of uplink carriers.

In yet another aspect of the disclosure, a computer program product is provided for use in a cellular network having an uplink with a plurality of uplink carriers including an anchor carrier and a secondary carrier, and a downlink having a plurality of downlink carriers. Here, the computer program product includes a computer-readable medium having code for providing feedback information corresponding to the plurality of downlink carriers, on an uplink channel on each of respective carriers in a subset of the plurality of uplink carriers.

In yet another aspect of the disclosure, an apparatus is provided for wireless communication in a cellular network having an uplink with a plurality of uplink carriers including an anchor carrier and a secondary carrier, and a downlink with a plurality of downlink carriers. Here, the apparatus includes a processing system configured to provide feedback information corresponding to the plurality of downlink carriers, on an uplink channel on each of respective carriers in a subset of the plurality of uplink carriers.

BRIEF DESCRIPTION OF THE DRAWINGS

FIG. 6 is a conceptual diagram illustrating a UE communicating with a Node B.

DETAILED DESCRIPTION

Figure 1:
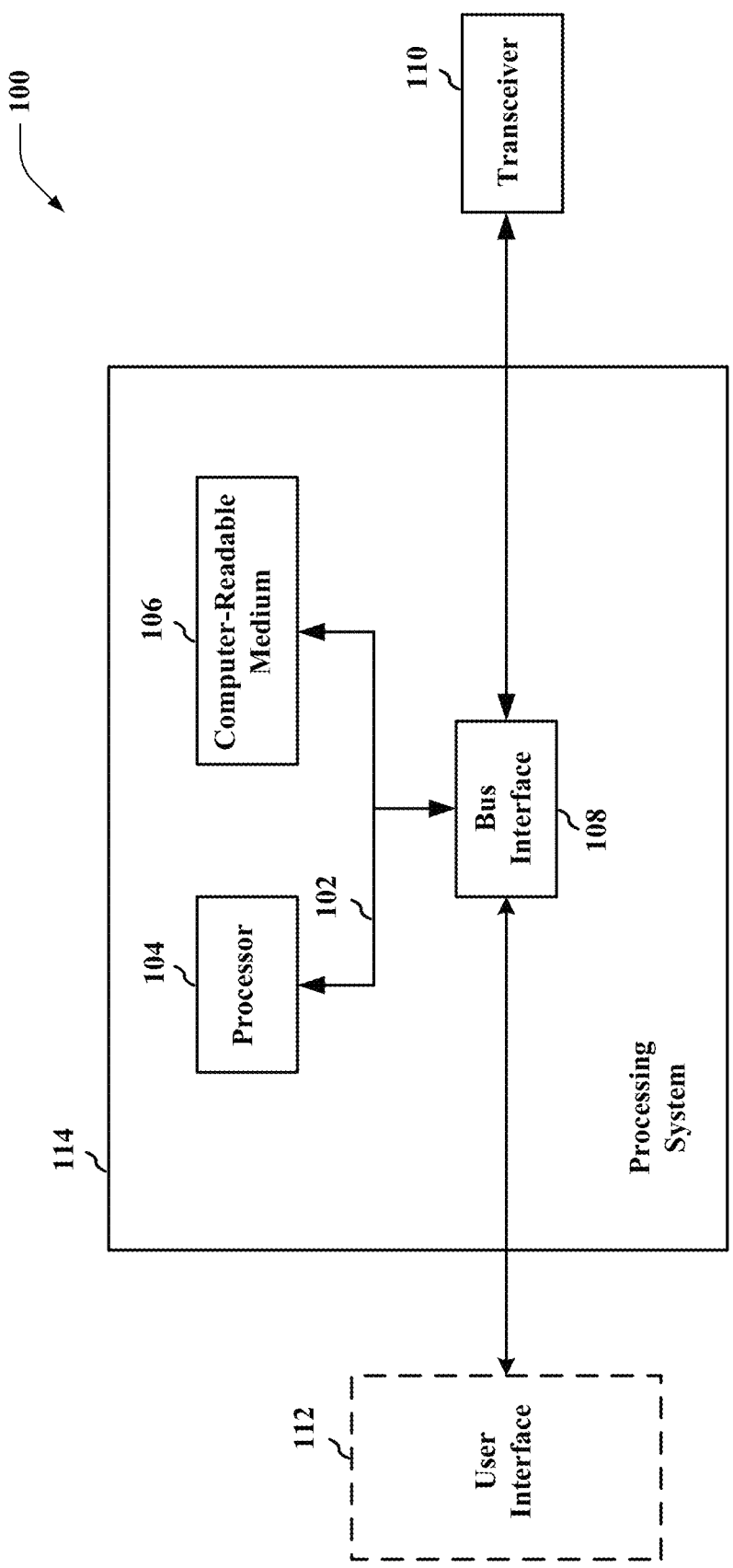
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
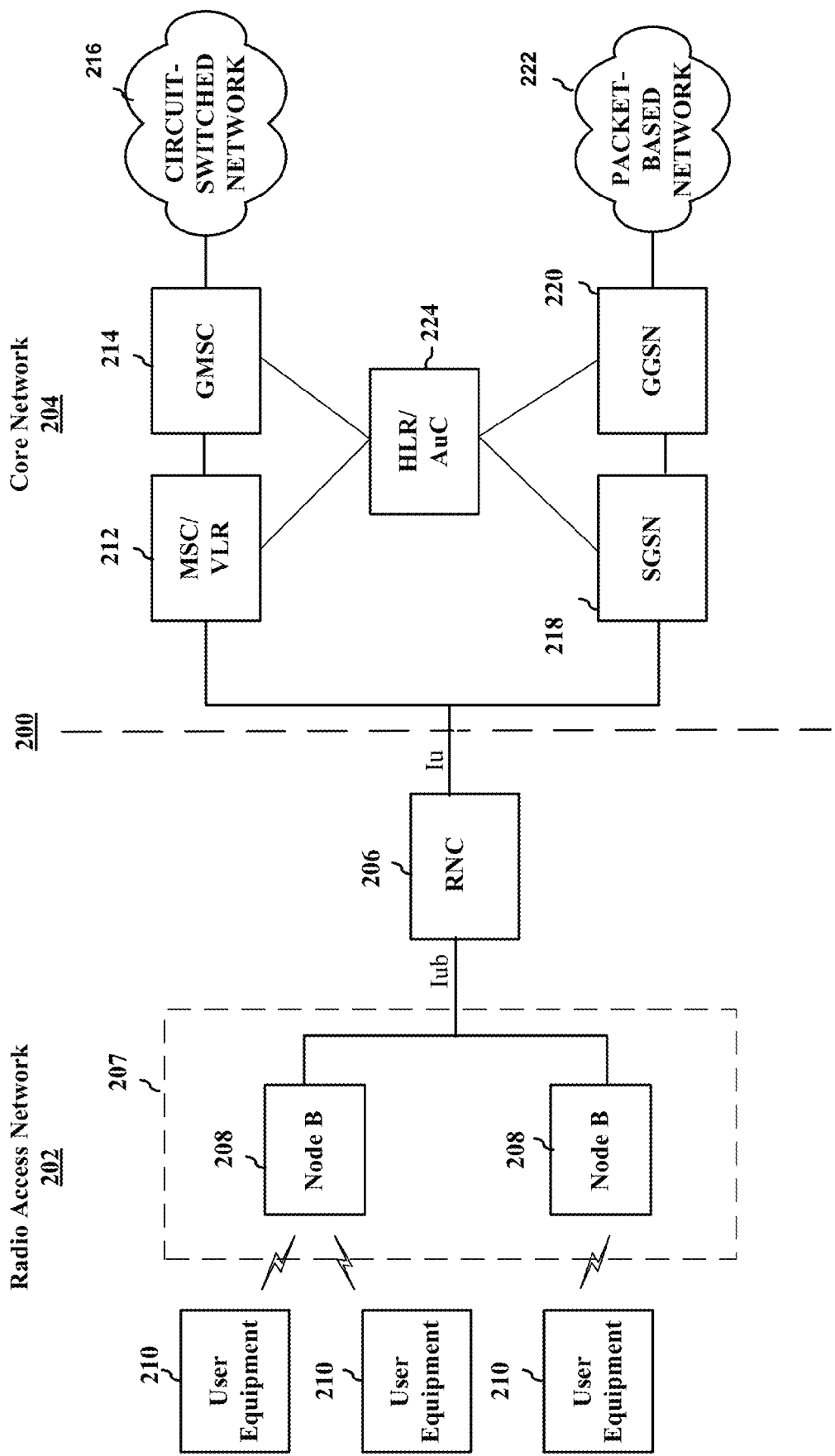
FIG. 2 is a conceptual diagram illustrating an example of a network architecture.

The various concepts presented throughout this disclosure may be implemented across a broad variety of telecommunication systems, network architectures, and communication standards. By way of example and without limitation, the aspects of the present disclosure illustrated in FIG. 2 are presented with reference to a UMTS system employing a W-CDMA air interface. In this example, the UMTS system includes a radio access network (RAN) 202 (e.g., UTRAN) that provides various wireless services including telephony, video, data, messaging, broadcasts, and/or other services. The RAN 202 may be divided into a number of Radio Network Subsystems (RNSs) such as an RNS 207, each controlled by a Radio Network Controller (RNC) such as an RNC 206. For clarity, only the RNC 206 and the RNS 207 are shown; however, the RAN 202 may include any number of RNCs and RNSs in addition to the RNC 206 and RNS 207. The RNC 206 is an apparatus responsible for, among other things, assigning, reconfiguring and releasing radio resources within the RNS 207. The RNC 206 may be interconnected to other RNCs (not shown) in the RAN 202 through various types of interfaces such as a direct physical connection, a virtual network, or the like, using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 208 are shown; however, the RNS 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 210 are shown in communication with the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 204 supports circuit-switched services with a mobile switching center (MSC) 212 and a gateway MSC (GMSC) 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 224 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR to determine the UE's location and forwards the call to the particular MSC serving that location.

The core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard GSM circuit-switched data services. The GGSN 220 provides a connection for the RAN 202 to a packet-based network 222. The packet-based network 222 may be the Internet, a private data network, or some other suitable packet-based network. The primary function of the GGSN 220 is to provide the UEs 210 with packet-based network connectivity. Data packets are transferred between the GGSN 220 and the UEs 210 through the SGSN 218, which performs primarily the same functions in the packet-based domain as the MSC 212 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The W-CDMA air interface is based on such direct sequence spread spectrum technology and additionally calls for a frequency division duplexing (FDD). FDD uses a different carrier frequency for the uplink (UL) and downlink (DL) between a Node B 208 and a UE 210.

Figure 3:
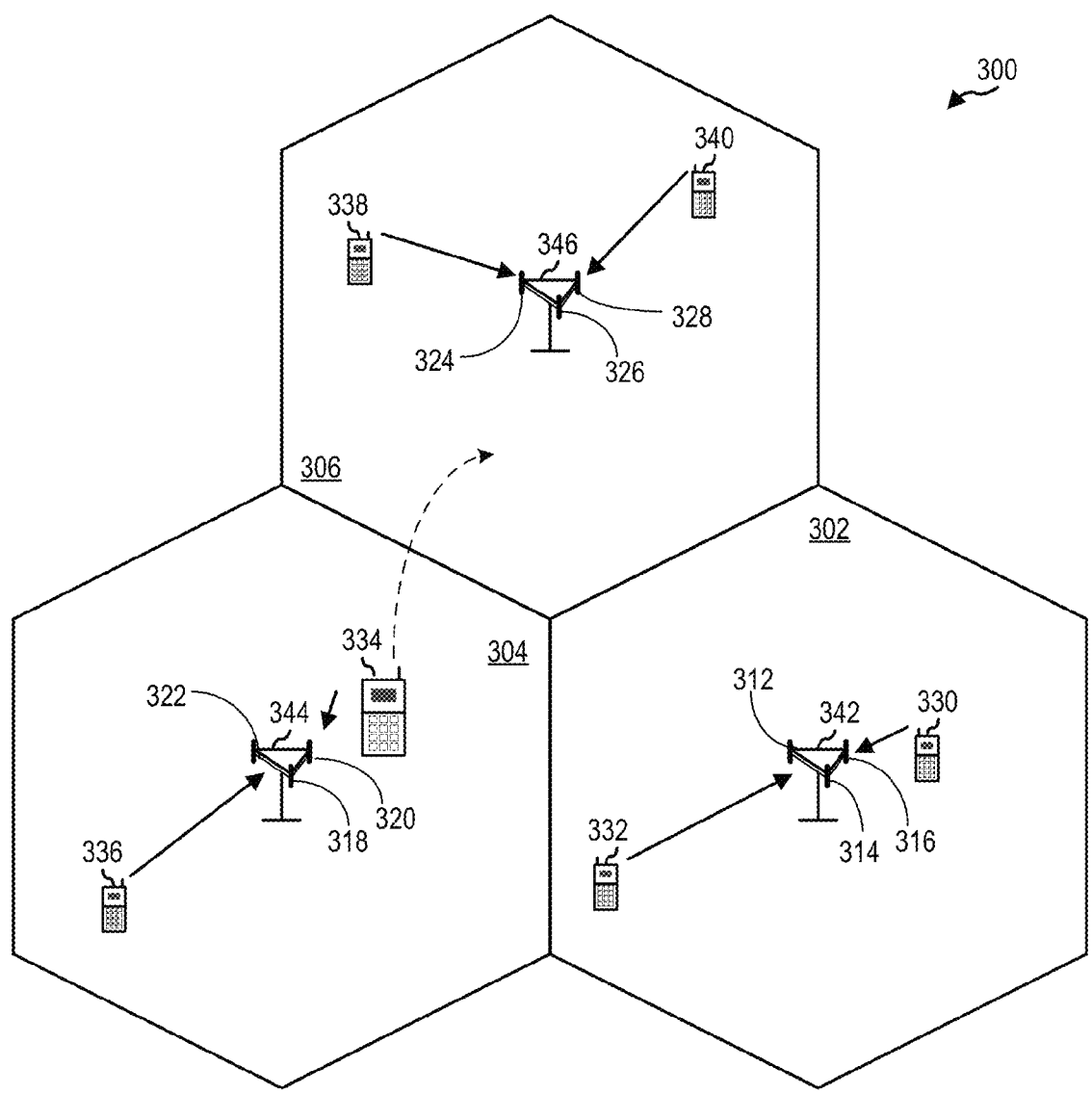
FIG. 3 is a conceptual diagram illustrating an example of an access network.

Referring to FIG. 3, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a core network 204 (see FIG. 2) for all the UEs 330, 332, 334, 336, 338, 340 in the respective cells 302, 304, and 306.

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The Node B (e.g., 342) may have multiple antennas supporting MIMO technology. The use of MIMO technology enables the Node B 342 to exploit the spatial domain to support spatial multiplexing, beamforming, and transmit diversity.

Spatial multiplexing may be used to transmit different streams of data simultaneously on the same frequency. The data steams may be transmitted to a single UE (e.g., 330) to increase the data rate or to multiple UEs (e.g., 330, 332) to increase the overall system capacity. This is achieved by spatially precoding each data stream and then transmitting each spatially precoded stream through a different transmit antenna on the downlink. The spatially precoded data streams arrive at the UE(s) 330, 332 with different spatial signatures, which enables each of the UE(s) 330, 332 to recover the one or more the data streams destined for that UE 330, 332. On the uplink, each UE 330 transmits a spatially precoded data stream, which enables the Node B 342 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Figure 4:
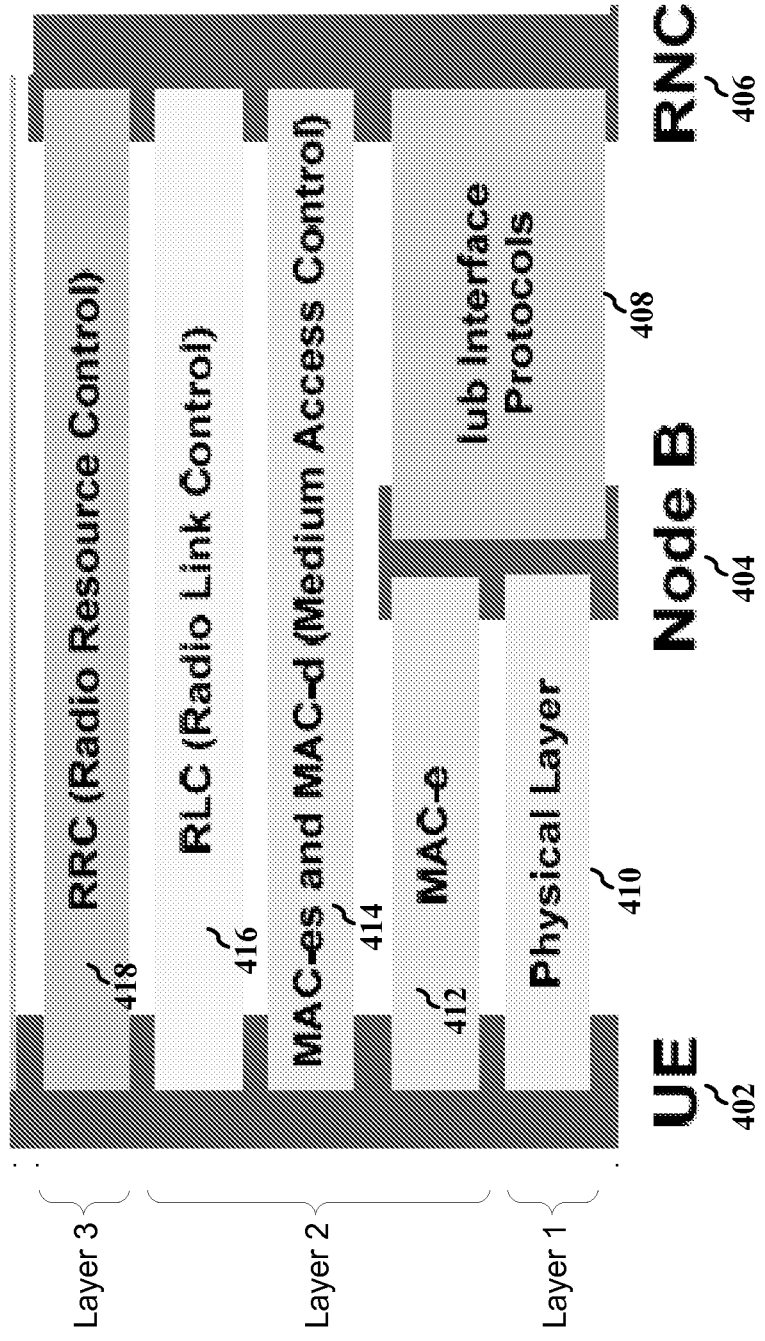
FIG. 4 is a schematic diagram illustrating a protocol stack used in an access network.

FIG. 4 is a schematic diagram illustrating a protocol stack used in a UTRAN implementing high-speed uplink packet access (HSUPA). Layer 1 of the protocol stack includes the physical layer 410, which transfers data over the radio link between a UE 402 and a Node B 404. Layer 2 of the protocol stack includes the MAC layers 412, 414, and the radio link control (RLC) layer 416. The RLC layer 416 provides segmentation, re-assembly, duplicate detection, and other traditional Layer 2 functions known to those skilled in the art, and provides packets to the MAC layers in the form of logical channels, which are mapped to transport channels, and in turn, to physical channels, as discussed below with relation to FIG. 5. In turn, the transport channels are the services offered by Layer 1 to the higher layers. To implement MAC protocols and procedures for HSUPA, the 3GPP Release 6 specifications define a sub-layer of MAC for the uplink called MAC-e/es. This sub-layer operates at the Node B 404 (MAC-e), at the RNC 406 (MAC-es) and the UE 402 (MACe/es). The location of MAC-e in Node B 404 enables fast retransmissions at the physical layer 410. The location of MAC-es in the RNC 406 is responsible for reordering of the data packets, since for HSUPA, a UE 402 may be in soft handover with multiple Node Bs 404. Information is passed from the MAC layers to the physical layer in the form of transport channels. That is, transport channel frames are constructed by the MAC sub-layer 412, 414 in the UE and sent over the air interface to each Node B 404 with which the UE 402 is in soft handover. The RNC 406 may receive identical transport channel frames from each Node B 404 over the Iub interfaces 408, and perform re-ordering. Layer 3 of the protocol stack includes the radio resource control layer (RRC), which handles establishment, release, and configuration of radio resources.

Figure 5:
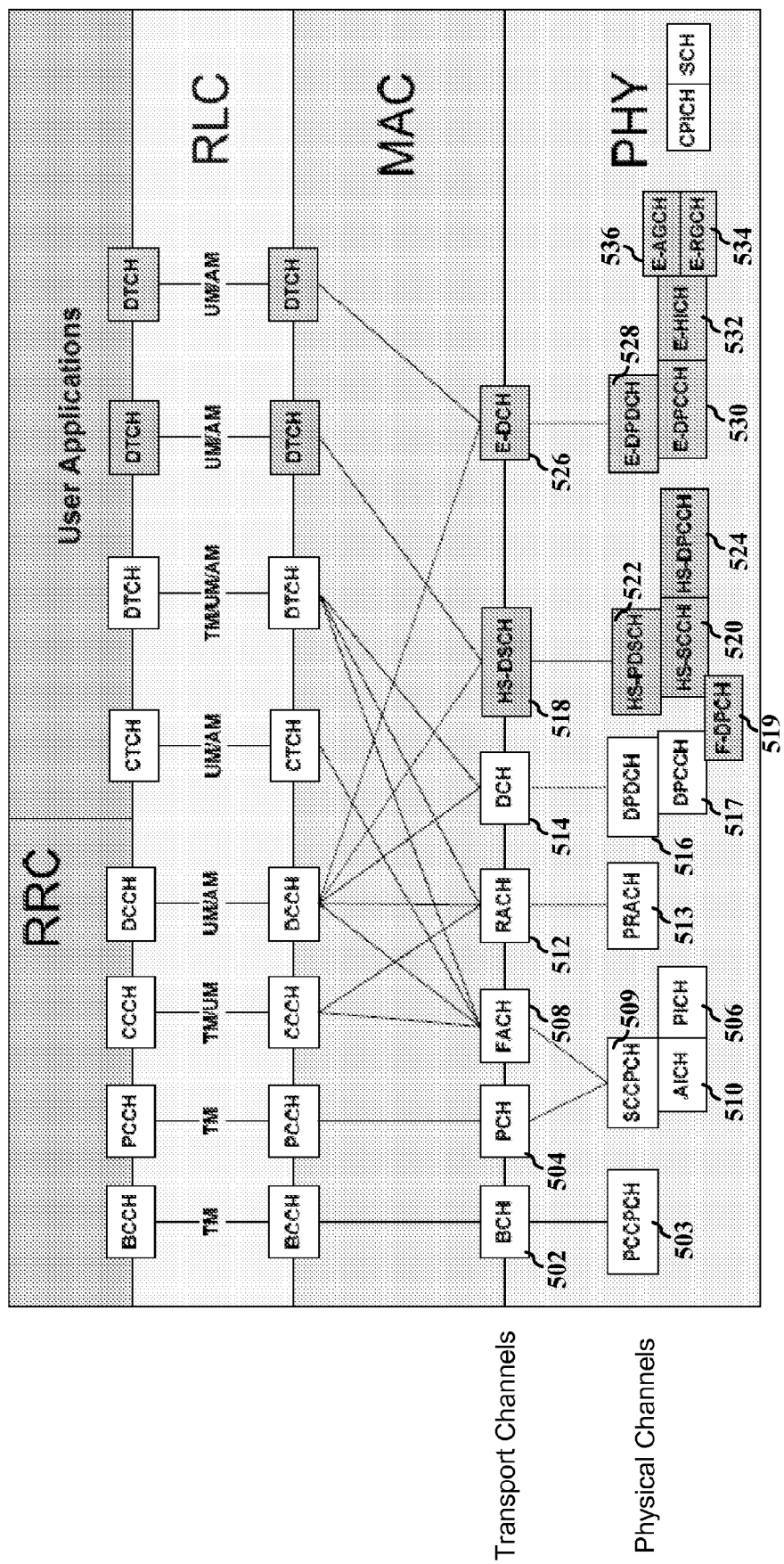
FIG. 5 is a conceptual diagram illustrating possible mappings of logical, transport, and physical channels in a system using HSUPA.

FIG. 5 is a conceptual diagram illustrating possible mappings of logical, transport, and physical channels in a system using HSUPA. In the description that follows, only certain transport channels and physical channels associated with those transport channels are discussed.

A broadcast channel (BCH) 502 is a downlink transport channel that may carry broadcast information that defines overall system configuration. A primary common control physical channel (PCCPCH) 503 is a downlink physical channel that may be used to carry the BCH transport channel. A paging channel (PCH) 504 is a downlink transport channel that may carry control information to a UE when the system does not know the location cell of the UE, e.g., paging notification messages. Here, a paging indicator channel (PICH) 506 may be associated with the PCH 504 to enable a UE quickly to determine whether it needs to read the PCH during its assigned paging occasion. A forward access channel (FACH) 508 is a downlink transport channel that may carry control information to a UE when the system knows the location cell of the UE. Here, the FACH 508 may also carry dedicated uplink signaling and user information to a UE operating in a Cell_FACH state, wherein the UE may continuously monitor the FACH 508 in the downlink. A secondary common control physical channel (SCCPCH) 509 may be used to carry the FACH 508 and the PCH 504 transport channels. Here, the FACH 508 and the PCH 504 may be carried by the same or different SCCPCH(s) 509, wherein up to 16 SCCPCHs may be transmitted from a cell or sector. An acquisition indicator channel (AICH) 510 may be associated with a FACH channel. A random access channel (RACH) 512 is an uplink transport channel that may carry control information from the UE. The RACH 512 may also carry uplink signaling and user information from a UE when it is operating in the Cell_FACH state. A physical random access channel (PRACH) 513 may be used to carry the RACH 512. A dedicated channel (DCH) 514 is an uplink or downlink transport channel that may carry dedicated signaling and user information to or from a UE operating in the Cell DCH state, for example, to deliver a reliable throughput for a circuit-switched call. Here, the DCH 514 may be mapped to a dedicated physical data channel (DPDCH) 516. An associated dedicated physical control channel (DPCCH) 517 may carry physical layer control information, such as power control commands. A fractional dedicated physical channel (F-DPCH) 519 may carry further physical layer control information.

With the introduction by 3GPP of Release 5 specifications, including HSDPA, three downlink channels and one uplink channel were added. A high speed downlink shared channel (HS-DSCH) 518 is a transport channel that may be shared by several UEs. The HS-DSCH may be associated with one or more shared control channels (HS-SCCH) 520. The HS-SCCH 520 is a physical channel that may be utilized to carry downlink control information related to the transmission of HS-DSCH 518. The UE may continuously monitor the HS-SCCH 520 to determine when to read its data from the HS-DSCH 518, and the modulation scheme used on the assigned physical channel. A high speed physical downlink shared channel (HS-PDSCH) 522 is a physical channel that may be shared by several UEs. The HS-PDSCH 522 may support quadrature phase shift keying (QPSK) and 16-quadrature amplitude modulation (16-QAM) and multi-code transmission. In an aspect of the disclosure, the HS-PDSCH 522 may be allocated to a user at 2 ms intervals. A high speed dedicated physical control channel (HS-DPCCH) 524 is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission. Those skilled in the art will comprehend that a UE operating HSUPA may also have additional Release 99 DCH and/or HSDPA channels.

Further, with the introduction by 3GPP of Release 6 specifications, including HSUPA, one new uplink transport channel and two new uplink physical channels were added. The heart of HSUPA is an uplink transport channel called the enhanced dedicated channel (E-DCH) 526, which may operate in the Cell_FACH state and IDLE mode. The E-DCH 526 may operate on either a 2 ms or 10 ms transmission time interval (TTI), carrying a single transport block per TTI. The E-DCH 526 may be mapped on one or more E-DCH dedicated physical data channels (E-DPDCH) 528, and may further have an associated E-DCH dedicated physical control channel (E-DPCCH) 530. The E-DPDCH 528 is an uplink physical channel that may carry uplink data for the E-DCH transport channel 526. The E-DPDCH 528 may support BPSK modulation with I and Q branches, and may be allocated every TTI. In an aspect of the disclosure, up to 4 channels may be used to carry the E-DCH transport channel 526 in a multi-code transmission scheme. The E-DPCCH 530 is an uplink physical channel for control information associated with the E-DPDCH 528. The E-DPCCH 530 may carry information about the transport format used on E-DCH 526, a HARQ retransmission sequence number, and may include one bit to support scheduling decisions at the Node B. An E-DCH hybrid ARQ indicator channel (E-HICH) 532 is a downlink physical channel that may carry feedback (ACK/NACK) from the Node-B on the previous data transmission, in order to support HARQ retransmission. Because HSUPA supports a soft handover, each cell belonging to the E-DCH active set may transmit the E-HICH 532. An E-DCH absolute grant channel (E-AGCH) 536 is a downlink physical channel that may carry scheduler grant information from the E-DCH serving cell. The absolute grant indicates directly to the UE the traffic-to-pilot ratio that may be used for scheduled transmissions on the E-DCH 526. An E-DCH relative grant channel (E-RGCH) 534 is a downlink physical channel that may carry scheduler grant information from cells belonging to the serving Node-B as well as to non-serving cells in E-DCH active set. The relative grant indicates to the UE to increase, decrease or maintain the current traffic-to-pilot ratio. The E-DPCCH 530 as well as E-HICH 532, E-AGCH 536, and E-RGCH 534 are physical layer (control) channels. That is, these channels may carry no upper layer information, and therefore have no logical or transport channel mapping.

Further enhancements to HSPA in 3GPP Release 7 added MIMO capabilities and higher-order modulation, and Release 8 added dual carrier (dual cell) DC-HSDPA. DC-HSDPA enables HSDPA to utilize two adjacent 5 MHz carriers in the transmission to a single UE, thus achieving 10 MHz of downlink bandwidth. This increased bandwidth generally increases the data rate, particular at low loading of a Node B. These two carriers include, on the downlink, an anchor carrier and a secondary (also referred to as a supplemental or supplementary) carrier. In general, the anchor downlink carrier includes a greater amount of control information than the secondary downlink carrier, and the secondary downlink carrier may be disabled when not being utilized.

3GPP Release 9 includes further enhancements to HSPA, among other things, by including dual cell functionality on the uplink, i.e., DC-HSUPA. Similar to DC-HSDPA, DC-HSUPA includes the aggregation of two typically adjacent 5 MHz carriers on the uplink. However, the configuration of the uplink has certain features and issues different from those confronted in configuring the downlink. For example, in the downlink, the transmission of the aggregated carriers comes from a central node, i.e., the Node B, whereas in the uplink, the transmission comes from multiple distributed nodes, i.e., the UEs. Thus, scheduling, feedback, power management, handover, and other functions may be unique to DC-HSUPA. Further, future enhancements in HSDPA and HSUPA may include more than two carriers (i.e., multiple-cell, or MC-HSPA) on one or both of the downlink and/or the uplink.

FIG. 6 is a conceptual diagram illustrating a UE 602 communicating with a Node B 604 utilizing a UTRAN capable of DC-HSDPA and DC-HSUPA. Here, the DC-HSUPA includes aggregated uplink transmissions on an anchor carrier 606 and a secondary carrier 608, which may be frequency division multiplexed for simultaneous transmission. In an aspect of the disclosure, the anchor carrier 606 is the uplink carrier that respects a duplex distance with respect to an anchor downlink carrier 610, and the secondary carrier 608 is the uplink carrier that respects a duplex distance with respect to the secondary downlink carrier 612. The anchor carrier 606 and the secondary carrier 608 may be contiguous or adjacent frequency carriers, and in various aspects, either one may have a higher frequency than the other. Of course, in another aspect of the disclosure, there may be more than two carriers on one or both of the uplink and/or the downlink, and the number of carriers on the downlink may be the same as or different than the number of carriers on the uplink.

In an aspect of the disclosure, DC-HSUPA may not require any new physical channels for the secondary carrier. That is, those physical channels utilized in HSUPA and illustrated in FIG. 5 may be transmitted on both the anchor carrier and the secondary carrier. For example, with respect to the HS-DPCCH 524 (see FIG. 5), the number of uplink carriers carrying this channel may be less than (e.g., a subset of) the number of downlink carriers for which it provides feedback information. Thus, in DC-HSPA (i.e., two carriers on each of the uplink and downlink), if two downlink carriers provide HS-DSCH 518, CQI and ACK/NACK information may be provided on HS-DPCCH 524 on one or both uplink carriers. In the case that the HS-DPCCH 524 is not available on one of the uplink carriers, in a system having two uplink carriers, this means that the other uplink carrier provides CQI and ACK/NACK information corresponding to both downlink carriers.

Figures 7A, 7B:
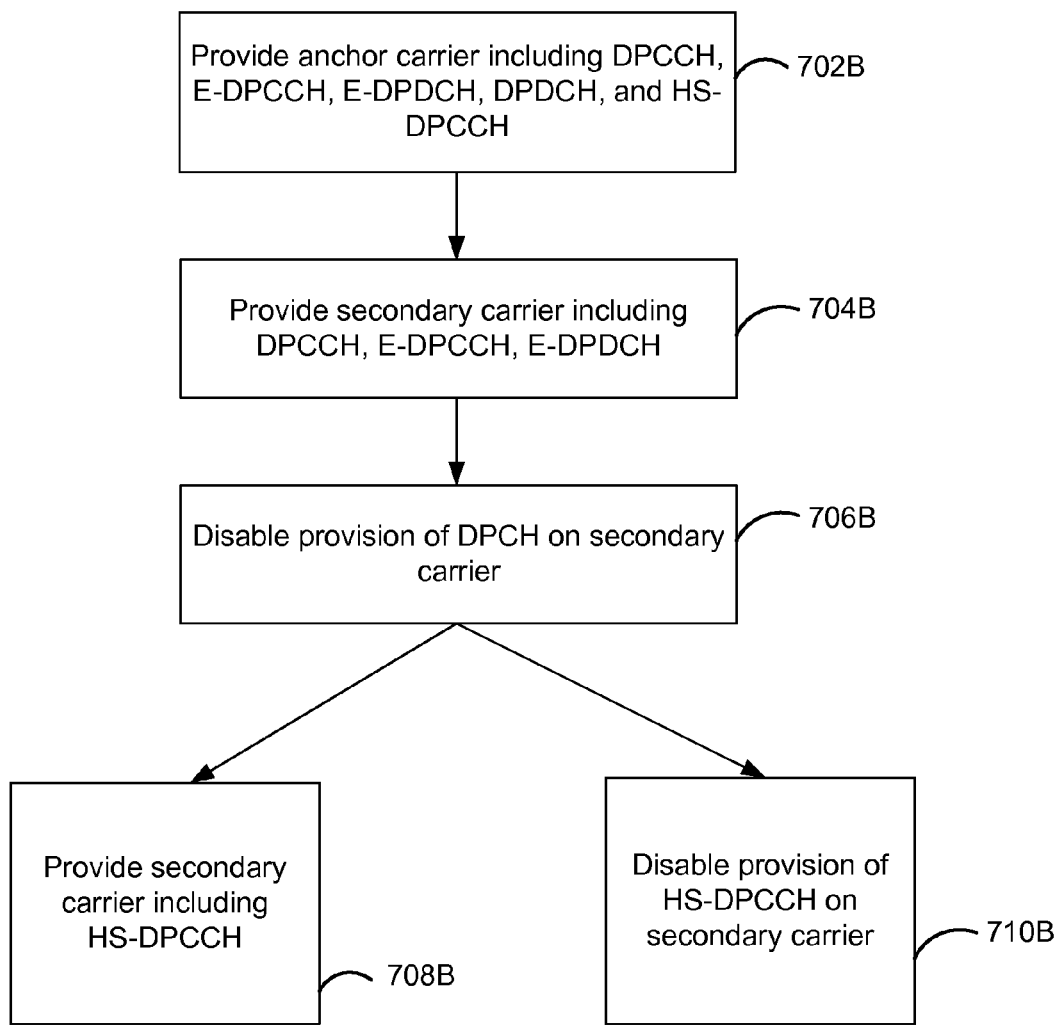
FIG. 7A is a table illustrating two configurations of dual HSUPA carriers according to an aspect of the disclosure.
FIG. 7B is a flow chart illustrating a process of providing information on HSUPA carriers according to an aspect of the disclosure.

FIG. 7A illustrates two scenarios, indicated by rows (A) and (B). In each of the illustrated scenarios, an "X" indicates that the corresponding channel is available to be configured by the respective Node B, and a "-" indicates that that channel is unavailable for configuration on that carrier. Thus, as illustrated in row (A), in one aspect of the disclosure, the Node B may configure the DPCCH 702, 712 and the E-DCH (carried on the E-DPDCH 710, 720 and the E-DPCCH 708, 718) on both uplink carriers, and may configure the DPDCH 704 and the HS-DPCCH 706 on the anchor carrier. However, in this aspect, the DPDCH 714 and HS-DPCCH 716 are unavailable for configuration by the Node B on the secondary carrier. That is, in this aspect, the secondary carrier is not utilized for an uplink dedicated data channel, and further, any feedback information relating to the HS-DSCH on both (or all) downlink channels, e.g., CQI and ACK/NACK, may be provided on HS-DPCCH 706 on the anchor carrier.

As illustrated in row (B), in another aspect of the disclosure, the Node B may configure the DPCCH 702, 712; the HS-DPCCH 706, 716; the E-DPCCH 708, 718; and the E-DPDCH 710, 720 on each of the anchor and secondary carriers; and the DPDCH 704 on the anchor carrier. However, in this aspect, the DPDCH 714 is unavailable for configuration by the Node B on the secondary carrier. Thus, in this aspect, the secondary carrier is not utilized for an uplink dedicated data channel.

FIG. 7B is a flow chart conceptually illustrating a process of receiving from a Node B configuration of certain channels on the anchor carrier and secondary carrier as illustrated in FIG. 7A. Here, in block 702B, the process provides an anchor carrier utilizing channels including DPCCH, E-DPCCH, E-DPDCH, and HS-DPCCH. In block 704B, the process provides a secondary carrier including channels DPCCH, E-DPCCH, and E-DPDCH. In block 708B, the process disables the provision of the DPDCH on the secondary carrier. In an aspect of the disclosure, in block 708B, the process provides the secondary carrier including the HS-DPCCH. In another aspect of the disclosure, in block 710B, the process disables the provision of the HS-DPCCH on the secondary carrier. Of course, this process presumes that each of the available channels, as illustrated in FIG. 7A, are configured by the Node B. However, in various aspects of the disclosure, at least some of the available channels may not be configured.

That is, in a further aspect of the disclosure, the downlink physical channels utilized to support operation on both uplink carriers 606, 608 (see FIG. 6) may be sent in a symmetrical fashion on each downlink carrier 610, 612. Thus, when the UE is in the Cell DCH state, each of the downlink carriers 610, 612 may include the E-AGCH 536 (see FIG. 5), the E-RGCH 534, and the E-HICH 532. Further, the F-DPCH 519 may be configured on both downlink carriers 610, 612 when the DPDCH 516 is not configured on the anchor carrier 610. In the case that the DPDCH 516 is not configured on either the anchor carrier 610 or the secondary carrier 608, the signaling information may be provided on the HS-PDSCH 522 on the downlink and E-DCH 526 on the uplink. When the DPDCH 516 is configured on the anchor carrier 610, the F-DPCH may be sent only on the secondary carrier 612.

Figure 8:
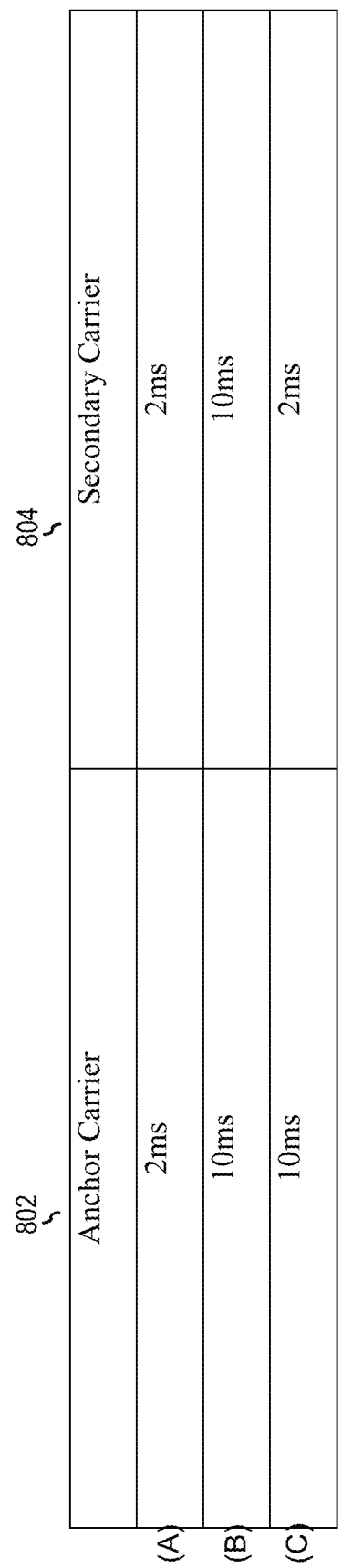
FIG. 8 is a table illustrating three configurations of TTIs on dual HSUPA carriers according to an aspect of the disclosure.

HSUPA channel timing is based on a Transmission Time Interval (TTI). A TTI is the time duration in which the MAC layers produce and transmit a set of data in transport blocks on a transport channel. In general, each transport channel may be configured to support a TTI of 2 ms (3 slots) or 10 ms (15 slots). FIG. 8 illustrates three potential configurations of TTIs in a HSUPA system. That is, in an aspect of the disclosure, illustrated in FIG. 8 row (A), the anchor carrier 802 and the secondary carrier 804 may both utilize a 2 ms TTI. In another aspect of the disclosure illustrated in FIG. 8 row (B), the anchor carrier 802 and the secondary carrier 804 may both utilize a 10 ms TTI. However, there may be networks that deploy both 2 ms and 10 ms TTIs simultaneously on the uplink. In this case, in another aspect of the disclosure illustrated in FIG. 8 row (C), the anchor carrier 802 may be configured with a 10 ms TTI, and the secondary carrier 804 may be configured with a 2 ms TTI. Thus, the UE may experience improved uplink coverage at an edge of a cell. Here, to implement the 10 ms TTI on the anchor carrier 802, the UE may employ five sequential 2 ms TTIs. Thus, when uplink coverage is limited, the Node B may temporarily de-activate the secondary carrier 804, without requiring the RNC to reconfigure the UE from the 2 ms TTI to the 10 ms TTI.

Figure 9:
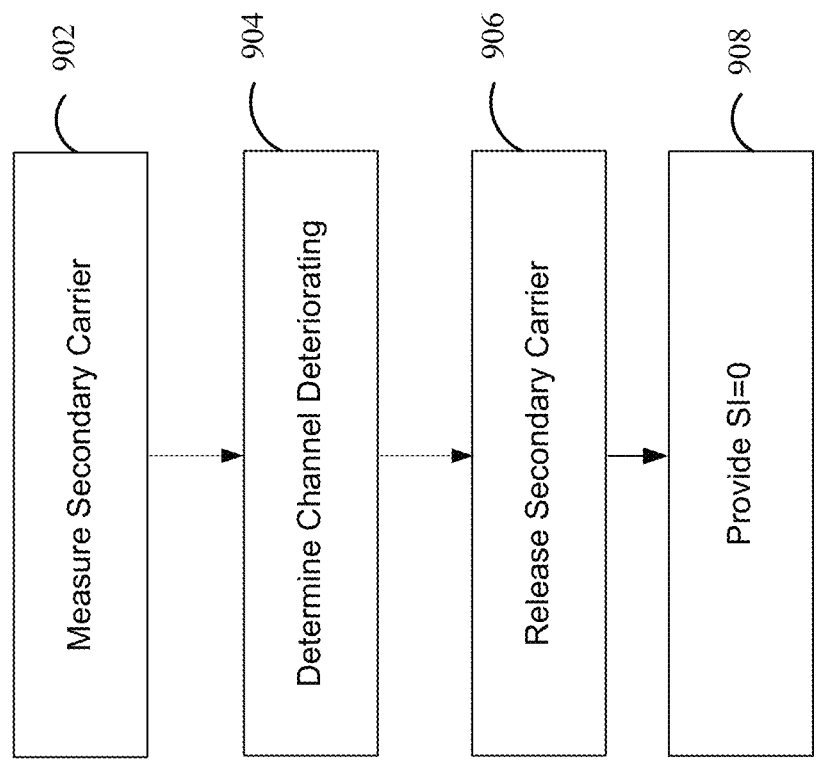
FIG. 9 is a flow chart illustrating a process of implicitly releasing a secondary carrier according to an aspect of the disclosure.

In a further aspect of the disclosure, the Node B may provide order types on the HS-SCCH 520, so that the UE may dynamically activate and de-activate the secondary uplink carrier 608. Here, the Node B may still choose to keep the secondary downlink carrier 612 activated while de-activating the secondary uplink carrier 608. In yet another aspect of the disclosure, illustrated in FIG. 9, rather than utilizing the order types provided on the HS-SCCH 520, the UE may implicitly release the secondary uplink carrier 608. That is, in 3GPP Release 7, enhancements to common states in HSDPA improved data rates, latency, etc. on the downlink. Release 8 introduced an enhanced uplink (EUL) capability, enabling up to 32 common E-DCH resources to be managed in each cell. Further, discontinuous reception (DRX) was added to the Cell_FACH state, reducing battery consumption. When a UE under these specifications is in the Cell_FACH state, utilizing EUL, a trigger for releasing an uplink resource largely depended on the emptying of the UE's E_DCH transmit buffer. In this aspect of the disclosure, in the case of DC-HSUPA, the trigger mechanism may be a deterioration of channel conditions, as measured by the UE. Thus, rather than involving the RNC, the UE may directly indicate this release to the Node B. In one example, the UE may utilize a segmentation indicator (SI), e.g., setting SI=0, to convey the release to the Node B. Of course, other indicators may be utilized to convey this release. Therefore, in block 902, the UE may measure the secondary carrier, and in block 904, the UE may determine that the channel on which the secondary carrier is propagated is deteriorating. In block 906, based on a determination that a metric of quality of the channel is deteriorating, the UE may release the secondary carrier. In block 908, the UE may provide an indication to the NB over the air interface (e.g., SI=0) to indicate the release of the secondary carrier.

Figure 10A:
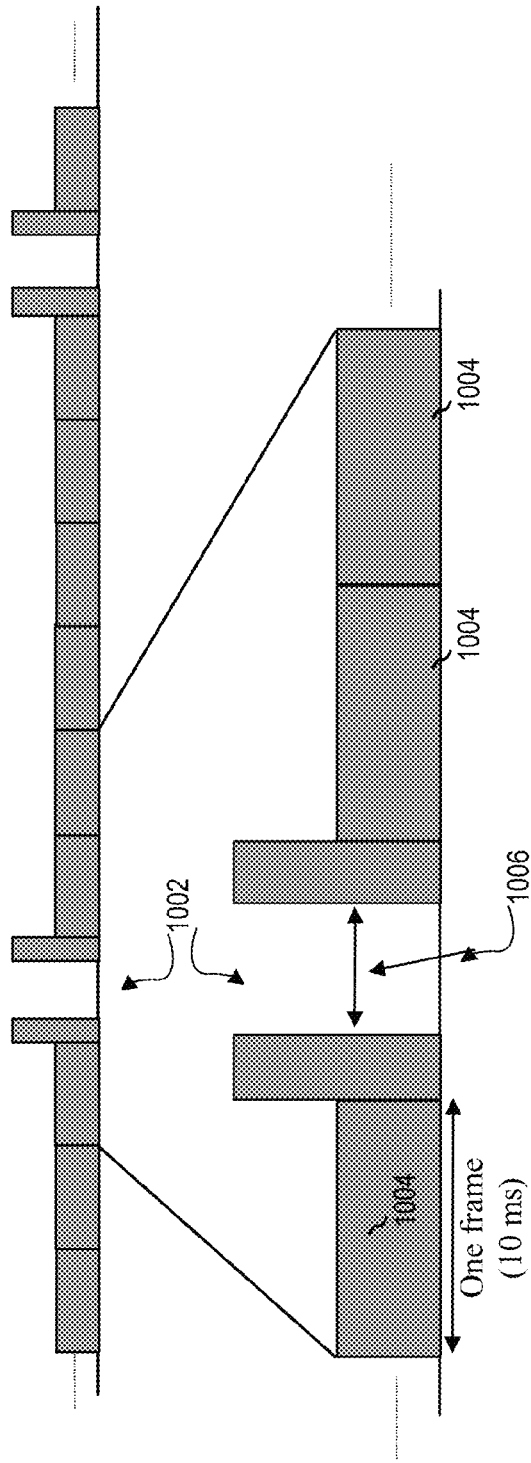
FIG. 10A-10B are a timing diagrams schematically illustrating a compressed mode used in DC-HSUPA according to an aspect of the disclosure.

UMTS includes a so-called compressed mode, which is one way to enable a UE to perform inter-frequency or inter-RAT (radio access technology) measurements. FIG. 10A is a conceptual diagram illustrating a compressed frame 1002 among a number of conventional frames 1004. That is, the transmission and reception during a frame 1002 may be stopped for a short time, so that the measurements may be performed on the other frequency or the other RAT during that gap 1006 time. After the gap 1006, the transmission and reception continues. During the frame or frames that include the gap 1006, so that the data in those frames is not lost, the data in those frames may be compressed and transmitted at a higher power.

Figure 10B:
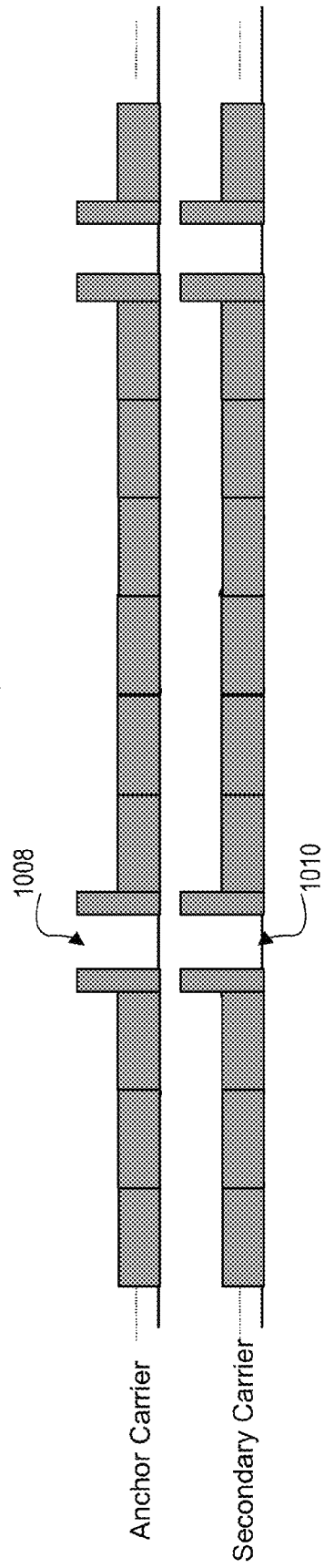

In another aspect of the disclosure, illustrated in FIG. 10B, the secondary carrier may include a gap 1008 aligned in time with the gap 1010 in the anchor carrier. That is, the anchor carrier and the secondary carrier may include a compressed mode in substantially the same way as the sole uplink carrier in previous releases. With the alignment of the gaps 1008, 1010, the capability for inter-frequency or inter-RAT measurements is retained.

Figure 11:
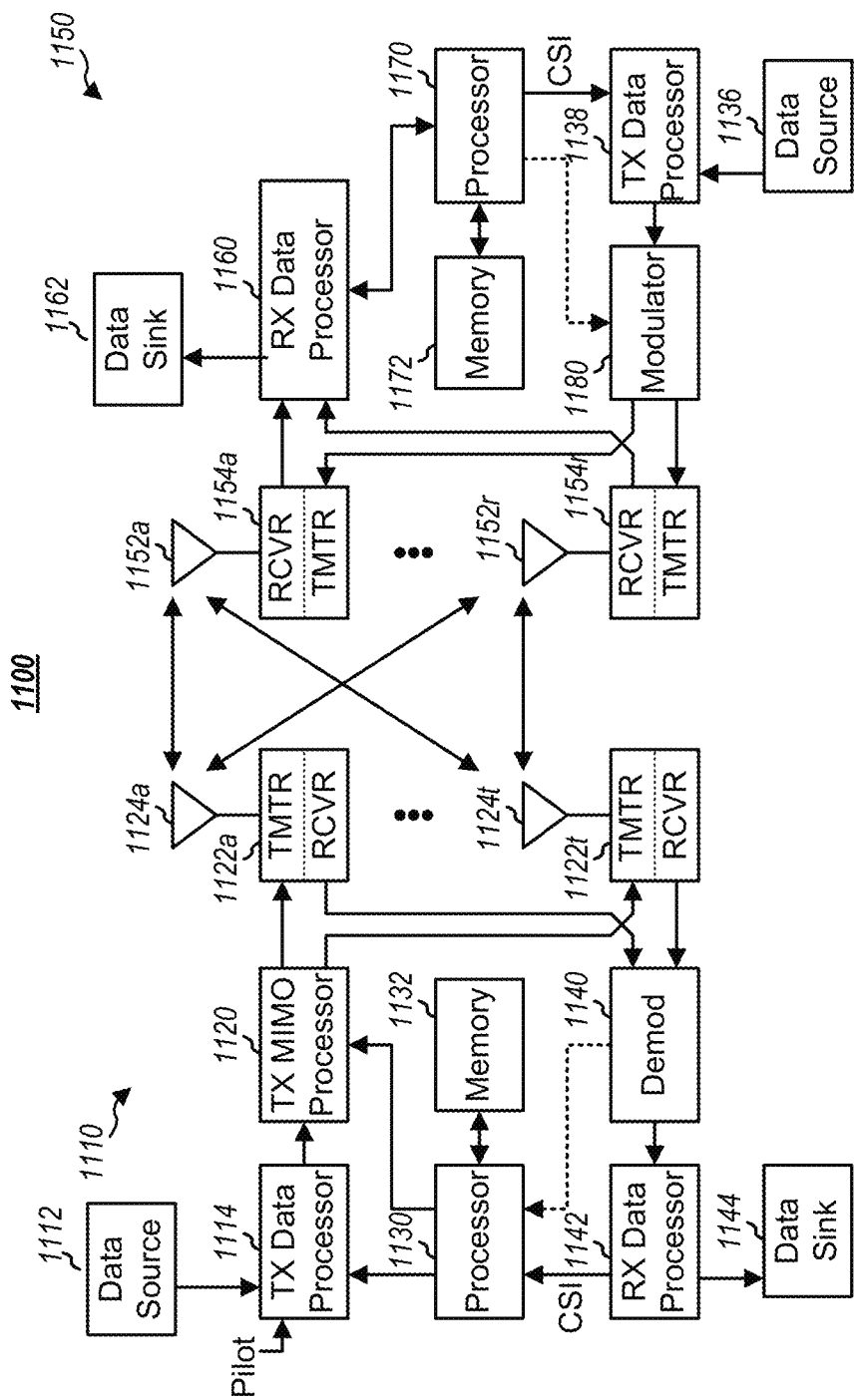
FIG. 11 is a block diagram illustrating an example of a Node B in communication with a UE in an access network.

FIG. 11 shows an example wireless communication system 1100. The wireless communication system 1100 depicts portions of one Node B 1110 and one UE 1150 for sake of brevity. However, it is to be appreciated that system 1100 may include more than one Node B and/or more than one UE, wherein additional Node Bs and/or UEs may be substantially similar or different from example Node B 1110 and UE 1150 described below. For example, in a system implementing DC-HSPA, all or part of the transmitting portions and the receiving portions of each of the Node B and the UE may be duplicated. In addition, it is to be appreciated that Node B 1110 and/or UE 1150 can employ the systems and/or methods described herein to facilitate wireless communication there between.

At Node B 1110, traffic data for a number of data streams is provided from a data source 1112 to a transmit (TX) data processor 1114. According to an example, each data stream may be transmitted over a respective antenna. TX data processor 1114 formats, codes, and interleaves the traffic data stream based on a particular coding scheme selected for that data stream to provide coded data.

The coded data for each data stream may be multiplexed with pilot data using orthogonal frequency division multiplexing (OFDM) techniques. Additionally or alternatively, the pilot symbols may be frequency division multiplexed (FDM), time division multiplexed (TDM), or code division multiplexed (CDM). The pilot data is typically a known data pattern that is processed in a known manner and may be used at UE 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream may be determined by instructions performed or provided by processor 1130.

The modulation symbols for the data streams may be provided to a TX MIMO processor 1120, which may further process the modulation symbols (e.g., for OFDM). TX MIMO processor 1120 then provides NT modulation symbol streams to NT transmitters (TMTR) 1122a through 1122t. In various aspects of the disclosure, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g. amplifies, filters, and upconverts) the analog signals to provide a modulated signal suitable for transmission over the MIMO channel. Further, NT modulated signals from transmitters 1122a through 1122t are transmitted from NT antennas 1124a through 1124t, respectively.

At UE 1150, the transmitted, modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective signal, digitizes the conditioned signal to provide samples, and further processes the samples to provide a corresponding "received" symbol stream.

An RX data processor 1160 may receive and process the NR received symbol streams from NR receivers 1154 based on a particular receiver processing technique to provide NT "detected" symbol streams. RX data processor 1160 may demodulate, deinterleave, and decode each detected symbol stream to recover the traffic data for the data stream. This traffic may then be provided to a data sink 1162, such as a speaker on the UE 1150, a display, an application program, etc. The processing by RX data processor 1160 is generally complementary to that performed by TX MIMO processor 1120 and TX data processor 1114 at Node B 1110.

A processor 1170 may periodically determine which available technology to utilize as discussed above. Further, processor 1170 may formulate a reverse link message comprising a matrix index portion and a rank value portion.

The reverse link message may comprise various types of information regarding the communication link and/or the received data stream. The reverse link message may be processed by a TX data processor 1138, which also receives traffic data for a number of data streams from a data source 1136, modulated by a modulator 1180, conditioned by transmitters 1154a through 1154r, and transmitted back to Node B 1110.

At Node B 1110, the modulated signals from UE 1150 are received by antennas 1124, conditioned by receivers 1122, demodulated by a demodulator 1140, and processed by a RX data processor 1142 to extract the reverse link message transmitted by UE 1150. The message may then be provided to a data sink 1144. Further, processor 1130 may process the extracted message to determine which preceding matrix to use for determining the beamforming weights.

Processors 1130 and 1170 may direct (e.g., control, coordinate, manage, etc.) operation at Node B 1110 and UE 1150, respectively. Respective processors 1130 and 1170 may be associated with memory 1132 and 1172 that store program codes and data. Processors 1130 and 1170 may also perform computations to derive frequency and impulse response estimates for the uplink and downlink, respectively.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication in a cellular network having an uplink comprising a plurality of uplink carriers including an anchor carrier and a secondary carrier, and a downlink comprising a plurality of downlink carriers, the method comprising:
   providing feedback information corresponding to the plurality of downlink carriers, on an uplink channel on each of respective carriers in a subset of the plurality of uplink carriers; and
   compressing frames transmitted via the anchor carrier and the secondary carrier to define respective time gaps, aligned in time, during which transmission is suspended.

2. The method of claim 1, wherein the feedback information comprises a CQI and an ACK/NACK corresponding to data on a plurality of downlink data channels.

3. The method of claim 1, wherein the plurality of uplink carriers consists of the anchor uplink carrier and the secondary uplink carrier, and the subset consists of the anchor uplink carrier.

4. The method of claim 1, further comprising:
   providing the anchor carrier with a 10 ms transmission time interval; and
   providing the secondary carrier with a 2 ms transmission time interval.

5. The method of claim 4, wherein the anchor carrier comprises five sequential 2 ms transmission time intervals.

6. The method of claim 1, further comprising:
   releasing the secondary carrier responsive to a deterioration of a metric of quality of the secondary carrier; and
   providing a direct indication on the uplink of the release of the secondary carrier.

7. An apparatus for wireless communication in a cellular network, the apparatus comprising:
   means for providing an uplink comprising a plurality of uplink carriers including an anchor carrier and a secondary carrier;
   means for receiving a downlink comprising a plurality of downlink carriers;
   means for providing feedback information corresponding to the plurality of downlink carriers, on an uplink channel on each of respective carriers in a subset of the plurality of uplink carriers; and
   means for compressing frames transmitted via the anchor carrier and the secondary carrier to define respective time gaps, aligned in time, during which transmission is suspended.

8. The apparatus of claim 7, wherein the feedback information comprises a CQI and an ACK/NACK corresponding to data on a plurality of downlink data channels.

9. The apparatus of claim 7, wherein the plurality of uplink carriers consists of the anchor uplink carrier and the secondary uplink carrier, and the subset consists of the anchor uplink carrier.

10. The apparatus of claim 7, further comprising:
    means for providing the anchor carrier with a 10 ms transmission time interval; and
    means for providing the secondary carrier with a 2 ms transmission time interval.

11. The apparatus of claim 10, wherein the anchor carrier comprises five sequential 2 ms transmission time intervals.

12. The apparatus of claim 7, further comprising:
    means for releasing the secondary carrier responsive to a deterioration of a metric of quality of the secondary carrier; and means for providing a direct indication on the uplink of the release of the secondary carrier.

13. A non-transitory computer-readable medium for use in a cellular network having an uplink comprising a plurality of uplink carriers including an anchor carrier and a secondary carrier, and a downlink comprising a plurality of downlink carriers, the computer program product comprising:
  code for providing feedback information corresponding to the plurality of downlink carriers, on an uplink channel on each of respective carriers in a subset of the plurality of uplink carriers, and for compressing frames transmitted via the anchor carrier and the secondary carrier to define respective time gaps, aligned in time, during which transmission is suspended.

14. The non-transitory computer-readable medium of claim 13, wherein the feedback information comprises a CQI and an ACK/NACK corresponding to data on a plurality of downlink data channels.

15. The non-transitory computer-readable medium of claim 13, wherein the plurality of uplink carriers consists of the anchor uplink carrier and the secondary uplink carrier, and the subset consists of the anchor uplink carrier.

16. The non-transitory computer-readable medium of claim 13, further comprising code for:
  providing the anchor carrier with a 10 ms transmission time interval; and
  providing the secondary carrier with a 2 ms transmission time interval.

17. The non-transitory computer-readable medium of claim 16, wherein the anchor carrier comprises five sequential 2 ms transmission time intervals.

18. The non-transitory computer-readable medium of claim 13, further comprising code for:
  releasing the secondary carrier responsive to a deterioration of the metric of quality of the secondary carrier; and
  providing a direct indication on the uplink of the release of the secondary carrier.

19. An apparatus for wireless communication in a cellular network having an uplink comprising a plurality of uplink carriers including an anchor carrier and a secondary carrier, and a downlink comprising a plurality of downlink carriers, the apparatus comprising:
  a processing system configured to provide feedback information corresponding to the plurality of downlink carriers, on an uplink channel on each of respective carriers in a subset of the plurality of uplink carriers, and compress frames transmitted via the anchor carrier and the secondary carrier to define respective time gaps, aligned in time, during which transmission is suspended.

20. The apparatus of claim 19, wherein the feedback information comprises a CQI and an ACK/NACK corresponding to data on a plurality of downlink data channels.

21. The apparatus of claim 19, wherein the plurality of uplink carriers consists of the anchor uplink carrier and the secondary uplink carrier, and the subset consists of the anchor uplink carrier.

22. The apparatus of claim 19, wherein the processing system is further configured to:
  provide the anchor carrier with a 10 ms transmission time interval; and
  provide the secondary carrier with a 2 ms transmission time interval.

23. The apparatus of claim 22, wherein the anchor carrier comprises five sequential 2 ms transmission time intervals.

24. The apparatus of claim 19, wherein the processing system is further configured to:
  release the secondary carrier responsive to a deterioration of the metric of quality of the secondary carrier; and
  provide a direct indication on the uplink of the release of the secondary carrier.

* * * * *